(12) United States Patent
Ringwald et al.

(10) Patent No.: US 8,126,620 B2
(45) Date of Patent: Feb. 28, 2012

(54) GRAIN TRANSFER CONTROL SYSTEM AND METHOD

(75) Inventors: Justin R. Ringwald, New Holland, PA (US); Christopher A. Foster, Adamstown, PA (US)

(73) Assignee: CNH America LLC, New Holland, PA (US)

( * ) Notice: Subject to any disclaimer, the term of this patent is extended or adjusted under 35 U.S.C. 154(b) by 443 days.

(21) Appl. No.: 12/431,285

(22) Filed: Apr. 28, 2009

(65) Prior Publication Data

US 2010/0274452 A1 Oct. 28, 2010

(51) Int. Cl.
*G01C 21/00* (2006.01)
*G06F 7/70* (2006.01)
*G06F 19/00* (2006.01)
*G06G 7/00* (2006.01)
*G06G 7/76* (2006.01)

(52) U.S. Cl. ............ 701/50; 701/207; 340/988; 141/67; 141/94; 141/192; 414/335; 414/345; 414/389; 414/398; 56/16.6; 460/114; 460/119

(58) Field of Classification Search .................... 701/50, 701/212, 207; 702/5; 340/988; 348/89–94, 348/143–160, 113–120; 141/231, 67, 94, 141/95, 192, 198; 414/334, 335, 398, 389, 414/340, 345; 56/16.6; 460/114, 119
See application file for complete search history.

(56) References Cited

U.S. PATENT DOCUMENTS

| | | |
|---|---|---|
| 3,452,885 A | 7/1969 | Love |
| 4,360,308 A | 11/1982 | Gifford et al. |
| 4,376,609 A | 3/1983 | Bohman et al. |
| 4,395,176 A | 7/1983 | Green |
| 4,529,348 A | 7/1985 | Johnson et al. |
| 4,846,676 A | 7/1989 | Mathis |
| 5,575,316 A | 11/1996 | Pollklas |
| 6,097,425 A | 8/2000 | Behnke et al. |
| 6,247,510 B1 | 6/2001 | Diekhans et al. |
| 6,682,416 B2 | 1/2004 | Behnke et al. |
| 6,943,824 B2 | 9/2005 | Alexia et al. |

*Primary Examiner* — Christopher J. Novosad
(74) *Attorney, Agent, or Firm* — Michael G. Harms

(57) ABSTRACT

A grain transfer control system, and method of use thereof, for automatedly controlling the transfer of grain from a mobile transferor-type vehicle, such as a combine harvester, to a mobile transferee-type vehicle, such as a crop transport, by varying the position and speed of the transferor-type and transferee-type vehicles relative to one another during the transfer operation, especially by varying the position and rate of walk of the discharge spout along at least a portion of the length of a grain holding receptacle of the transferee-type vehicle, to effect a generally even fill of the grain holding receptacle of the transferee-type vehicle along the length of the grain holding receptacle.

20 Claims, 9 Drawing Sheets

GRAIN TRANSFER CONTROL SYSTEM AND METHOD

TECHNICAL FIELD

The present invention is directed to agricultural equipment, including combine harvesters and related crop transport equipment, and more particularly to a grain transfer control system, and method of use thereof, for automatedly controlling the transfer of grain from a mobile transferor-type vehicle, such as a combine harvester, to a mobile transferee-type vehicle, such as a crop transport, by varying the position and speed of the transferor-type and transferee-type vehicles relative to one another during the transfer operation, especially by varying the position and rate of walk of the discharge spout along at least a portion of the length of a grain holding receptacle of the transferee-type vehicle, to effect a generally even fill of the grain holding receptacle of the transferee-type vehicle.

BACKGROUND ART

For many years, agricultural equipment, sometimes denoted herein by the abbreviation AE, and the individual agricultural machines of such agricultural equipment, have been operated under control of an operator thereof to perform various operations or actions, including, among other things, the harvesting, transfer, and transport of crops. The performance by such agricultural equipment of the various actions has sometimes been based upon various data relating, among other things, to the individual machine being operated as well as to crop type, weather conditions, topographical conditions, and the position of the individual machine in the field from which the crop is being harvested or relative to other agricultural equipment. In addition, the status of such agricultural equipment or features or components thereof, such as, for example, the fill status of a grain bin of a combine harvester and the position of the combine harvester in a field being harvested, and the load status of a crop transport vehicle, such as a grain cart, and its position, especially relative to combine harvesters in a field, has been considered pertinent information, which, when it can be properly shared amongst the relevant agricultural equipment, has been beneficial in the interplay and interaction of such relevant agricultural equipment as they perform a particular agricultural operation, such as the harvesting of a crop in a field and the transfer of the harvested crop to a crop transport vehicle.

In part, to facilitate the coordination of activities between and among various individual pieces or machines of agricultural equipment, communications systems and devices of various types and constructions have been developed and installed on or in the individual agricultural machines so as to allow communications therebetween by the operators thereof and, in more recent years, even the communication or exchange of various data between two individual agricultural machines, typically by RF wireless communications.

In earlier systems, voice communications allowed the operator of a first individual agricultural machine to establish a communications link with and to orally communicate information, including machine location and operating information and status, to the operator of a second agricultural machine, including a different type of agricultural machine, thereby allowing the operator of the second agricultural machine to make adjustments in the operation of his or her individual machine as conditions might warrant. When the communications were between different types of agricultural machines, such as between a combine harvester and a crop transport vehicle, such communication was often intended to permit the navigation of the second agricultural machine to join or intercept the first agricultural machine, such as for the transfer of a harvested crop from the first to the second agricultural machine.

More recently, in some instances and with some communications systems, the machine operator of a combine harvester has been able to establish a communications link with and to provide data in an electronic form to a different operator or to the control system associated with the different agricultural machine, such as a crop transport vehicle, in order to permit coordination of crop transfer to the crop transport vehicle and, in some cases, to even remotely exercise some control over such crop transport vehicle, such as steerage of the crop transport vehicle to meet the combine harvester at the combine harvester's position in a field, and the scheduling of the time and location for the combine harvester and the crop transport vehicle to meet.

In other instances and with other systems, the machine operator of a crop transport vehicle, such as a grain cart, has been able to receive on individual bases electronic data from one or more combine harvesters to permit the control system associated with the crop transport vehicle to coordinate the scheduling of positionings of the crop transport vehicle relative to the crop harvesters and the automated steerage of the crop transport vehicle to meet the combine harvesters at the combine harvesters' positions in a field so that coordinated transfers of the harvested crop from the combine harvesters to the crop transport vehicle can be effected.

For the most part, the electronic data so provided or received has related to the location and relative positionings of the combine harvesters and transport vehicles, with, in some instances, an operator of the combine harvester or the crop transport vehicle having the further ability to act as a master and to remotely control to some extent the navigation and/or steerage of others of the agricultural vehicles as slave vehicles in order to effect interceptions therebetween for the transfer of harvested crop from the combine harvesters to the transport vehicles.

In some situations, the control system of a slave vehicle has been so designed that, instead of, or in addition to, facilitating the steerage or navigation of the slave vehicle to effect an intercept with a master vehicle, the slave vehicle is controlled to follow, or to remain at a relatively fixed distance from, the master vehicle, based upon a continuing communication of the positioning and location information between or regarding the master and slave vehicles.

For the most part, when such systems have been employed, the operator of the harvester has remained responsible for manually commencing the actual unloading operation once the harvester and transport are properly positioned for unloading and for then monitoring and manually controlling the unloading. In some instances, certain sensors and monitors of various types have been operable to detect conditions that might be considered problemsome for continued unloading and to provide indications to the operator so that appropriate actions could then be taken by such operator, such as a re-positioning of the discharge arm of the harvester to alter the angle of extension of the discharge arm from the harvester or a re-orientation of the discharge spout at the end of the discharge arm to alter the discharge flow path from the discharge arm, or even discontinuation of the unloading operation. With certain systems, some minor adjustments to the positioning of the discharge arm or re-orientation of the discharge spout, within certain limits, may even have been effectable without operator intervention, but, for the most part, close and continuing operator attention and intervention, especially in the event of undesirable conditions and to effect commencement and termination of unloading operations, has remained a necessity. Such necessity for close and continuing operator attention poses difficulties for an operator when unloading is occurring on-the-go since the operator may also be attempting to monitor and control other events at such time, including the continuing harvesting operation.

In addition, with many of such systems it has remained difficult to achieve a desired uniform, or even, fill level of the crop transport regardless of whether the transfer or grain unloading operation has been manually or automatically controlled, due in part to the sizes of the grain holding receptacles of the transport vehicles and to the nature of fill as grain is directed into the grain holding receptacle from the spout of a discharge arm associated with the transferor-type vehicle. In general, the grain tends to pile up below the discharge spout and to assume, to some extent, the shape of a mound, with a higher grain elevation and concentration below the discharge spout and lower elevations and concentrations in radial directions therefrom, resulting in underutilization of the storage capacities of the transferor-type vehicles.

To try to address such problem and to achieve a more uniform fill of grain holding receptacles, some unloading systems have been designed to permit or to control some automated movement of the discharge arm or the discharge spout at the end thereof during the course of an unload operation, while the positions of the transferor-type and transferee-type vehicle relative to one another remain fixed. Dependent upon the system, such movement could include resettings of the angle at which the discharge arm extends from the transferor-type vehicle towards the transferee-type vehicle and/or angular re-orientations of the discharge spout during the course of the unload operation, the intent of which would be to alter the discharge flow path during the course of the unload operation to thereby effect a less concentrated area of grain discharge from the spout.

While such systems have resulted in some improvements in achieving a more uniform fill of some grain holding receptacles, they have required relatively complex subsystems for automatedly effecting the desired movements of the discharge arm and discharge spout thereof relative to the transferor-type vehicle, and, so also, the transferee-type vehicle, and for determining times for such movements as well as for ensuring that the movements will not result in crop spillage and loss during the unload operation. The integration of such subsystems of both a transferor-type and transferee-type vehicle into a unified grain transfer control system has been challenging, especially due to the complexity of such a system. In addition, problems with effecting an even fill have remained, especially when the crop transports have been grain carts of a larger size, with relatively large, generally rectangular (when viewed from above), grain holding receptacles, such as may be found in the Kinze 1050 and J&M 1325 carts, especially inasmuch as there are limits, while the positions of the transferor-type and transferee-type vehicle relative to one another remain fixed, as to the amount of movement and/or re-orientation that can be realized with the discharge arm and the discharge spout thereof before the discharge flow path would be directed to fall outside of the grain holding receptacle.

Consequently, users of agricultural equipment have continued to seek simple and reliable systems and methods for coordinating unloading operations between a harvester and a grain transport vehicle and for communicating and exchanging information therebetween during unloading operations, and for doing so in such a way and in such an environment that grain transfer operations can be automatedly effected so as to result in a more complete and uniform fill and distribution in the grain holding receptacles of the grain transport vehicles, with minimal operator attention and continuing involvement required once an unloading operation has been initiated.

SUMMARY OF THE INVENTION

The present invention is thus directed to a grain transfer control system for automatedly controlling the transfer of grain from a mobile transferor-type vehicle, such as a combine harvester, which has opposed sides and includes a grain storage bin with a grain discharge assembly operable for effecting the transfer of grain out of said grain storage bin, to a mobile transferee-type vehicle, such as a grain cart, which has a grain holding receptacle of a predetermined length and width to generally define opposed ends and sides of the grain holding receptacle, by varying the position and speed of the transferee-type vehicle and the transferor-type vehicle relative to one another during the course of the grain transfer operation to effect a generally even fill of the transferee-type vehicle. The grain discharge assembly of the transferor-type vehicle will typically have associated therewith a discharge arm with a discharge spout for directing a flow of grain therethrough, with the discharge arm being extendible from the transferor-type vehicle to position the discharge spout at a desired position distanced from a side of transferor-type vehicle and generally along the length of the grain holding receptacle.

Such grain transfer control system includes a positioning system associated with the transferor-type and the transferee-type vehicles for determining the positions thereof relative to one another and for automatedly controlling and maintaining desired spaced positioning therebetween as they are moved, with such positioning system including a control portion associated with at least one of the transferor-type and the transferee-type vehicles for initiating a grain transfer operation when the transferee-type vehicle has been positioned at a spaced distance from the transferor-type vehicle, generally to a side of the transferor-type vehicle, and the discharge spout has been positioned to direct a flow of grain therefrom into the grain holding receptacle of the transferee-type vehicle nearer one end of the grain holding receptacle and for thereafter effecting the grain transfer operation.

Typically, the transferor-type and the transferee-type vehicles will each have an operating system that includes an operator interface portion, a sensor input portion, a master machine control, and an operation performance portion, with the master machine control operatively connected to such other noted portions. The operator interface portion includes operator input controls operable to provide operator input data to the master machine control. The sensor input portion is operable to monitor certain operational conditions, which preferably includes the GPS position of the machine, and to provide sensor input data to the master machine control. The output performance portion is operable to effect performance of certain actions by such individual agricultural machine under control of the master machine control thereof.

Each of such vehicles will typically also have associated therewith a communications control portion operable to transmit and receive communication signals, which communications control portion is operatively connected to the master machine control of the operating system to effect communication therefrom and thereto of communications data. Preferably, each such vehicle that has such a communications control portion may be controllably operated to enable such communications control portion to engage in vehicle-to-vehicle communications, sometimes hereinafter referred to as V2V communications.

In addition, and preferably, the individual operating systems of such vehicles may be operable, including through their communications control portions, to determine for each vehicle its GPS position and to determine or calculate the GPS coordinates of particular portions or features of such vehicle, although other relative positioning systems or methods can also or alternatively be employed to establish relative positioning thereof. For purposes of the present invention, such operating systems of the individual vehicles should be so operable that the vehicles may be positionable relative to one another and electronically linked to one another to thereafter operate in unison with one another to effect and control the positionings, speed, and steerage thereof during subsequent operations.

One example of a system that employs short range communications for interactively coordinating the positioning of a transferor-type vehicle and a transferee-type vehicle for the transfer of grain therebetween may be found in co-pending U.S. application Ser. No. 12/284,310, filed Dec. 18, 2008, which is incorporated herein by reference thereto.

The control portion of the grain transfer control system includes input controls, such as operator input controls of the operator interface portion of a vehicle operating system, operable by a user to input data and control information, and a controller portion, such as a processor associated with the master machine control of such vehicle operating system, operable to automatedly control the grain transfer operation in accordance with the input data and control information.

Preferably, such controller portion may take the form of a microprocessor programmed to be responsive to control information to commence a grain transfer operation when the discharge spout associated with a combine has been positioned at a transfer start position relative to the length of the grain holding receptacle of an electronically linked grain cart, to thereafter automatedly transfer grain for an initial dwell time while the discharge spout remains at said transfer start position, effect an ongoing repositioning of the grain cart relative to the combine to walk the discharge spout along at least a portion of the length of the grain holding receptacle as grain transfer continues until the discharge spout reaches a transfer end position relative to the length of the grain holding receptacle of the grain cart, continue grain transfer for a terminal dwell time while the discharge spout remains at said transfer end position, and terminate the grain transfer operation. In so controlling such grain transfer operation, such grain transfer control system effects a generally even fill of the grain holding receptacle along its length.

Preferably, the transfer start and end positions and initial and terminal dwell times may be selectable and alterable by a user, such as by data and control information entered through operator controls associated with an operator interface, including one or more potentiometers that may be operable during the course of a grain transfer operation, such as to control the rate of walk of the discharge spout along the length of the grain holding receptacle.

Similarly, the mode of the walk of the discharge spout along at least a portion of the length of the grain holding receptacle may be selectable and alterable by a user to effect a walk of the discharge spout, for example, at a uniform rate of speed, in uniform or variable steps, at a sinusoidally varying rate of speed, or in accordance with a user defined profile of walk or creep velocity versus position along the length of the grain holding receptacle.

To avoid grain waste, the grain transfer control system will preferably include features and/or programming to try to ensure that grain being discharged from the discharge spout is directed so as to fall within the grain holding receptacle and to terminate grain transfer in the event that the actual or projected discharge flow would fall outside of such grain holding receptacle. In one preferred embodiment, positioning data can be utilized to determine the position of the discharge spout relative to the grain holding receptacle, including the height of the discharge spout above the top of the grain holding receptacle, as well as the orientation of the discharge spout, from which the projected discharge flow can be determined, such as by comparison with stored look-up tables, or by calculations based upon such positioning data, and a determination can be made as to whether or not the grain being discharged will impact within the grain holding receptacle. In the event that it would be determined that the discharge flow would impact outside of the grain holding receptacle, the grain transfer control system would typically terminate the grain transfer operation.

Inasmuch as the positions of electronically linked transferor-type and transferee-type vehicles relative to one another are important for the conduct of the automated unloading operation, maintenance of both effective and ongoing position determinations and a stable communications link between such vehicles during unloading operations is required. Consequently, the grain control transfer system is therefore also preferably operable such that if either position determination or V2V communications are lost during an unloading operation, unloading will automatedly cease, either by a pause in the unloading operation until such problem is corrected or by a cancellation and termination of the unloading operation.

In addition, the grain transfer control system will also preferably be responsive to operator inputs in the form of operator override data and controls to permit operators of such vehicles, especially a combine, to assume manual control at any time and to take such actions as might be appropriate under then-existing circumstances.

Consequently, the system and method of the present invention permits an electronically linked transferor-type and transferee-type vehicle to automatedly control a grain transfer operation therebetween in such a way as to effect a more even fill of a grain holding receptacle of the transferee-type vehicle along the length of such grain holding receptacle, and to be able to do so without the complexities that would be associated with systems requiring angular movements of the discharge arm and/or re-orientations of the discharge spout relative to the transferor-type vehicle, and, so also, the transferee-type vehicle, during the course of unload operations.

BRIEF DESCRIPTION OF THE DRAWINGS

FIG. 2 is a block diagram of various components associated with an operating system of a piece of agricultural equipment or the like.

DETAILED DESCRIPTION OF THE INVENTION

Figure 1:
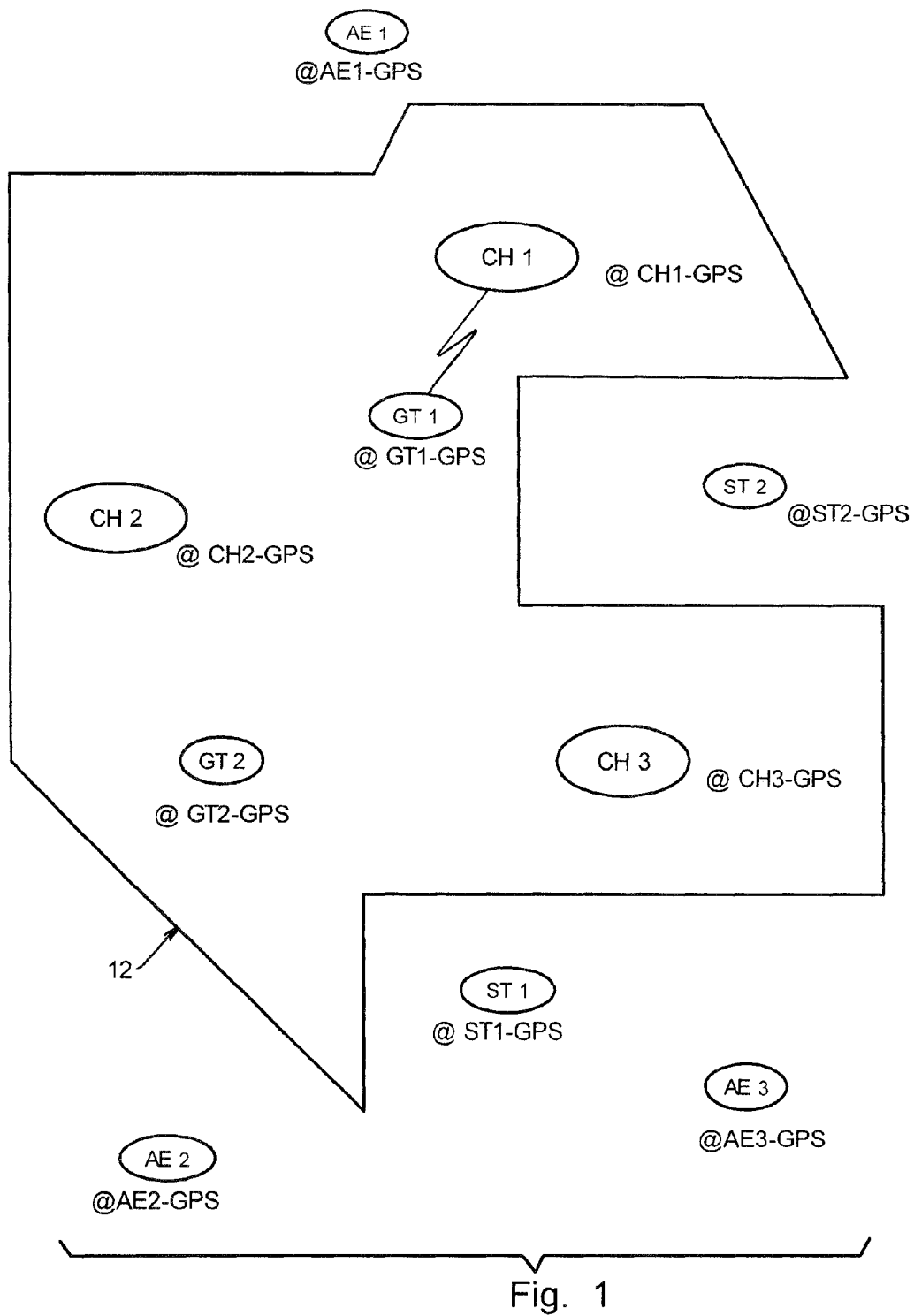
FIG. 1 is a diagram depicting a representative field in which or about which several combine harvesters, tractors with grain transports, and semi-trailer transporters are disposed, as well as other extraneous agricultural equipment.

Referring now to the drawings, wherein like numbers refer to like items, FIG. 1 depicts a field 12 with a plurality of agricultural vehicles of various types therein and therearound, including combine harvesters CH1, CH2, and CH3, tractors with grain transports GT1 and GT2, and semi-trailer transporters ST1 and ST2, all of which machines are engaged in the harvesting of the particular crop in field 12, including the transport of such crop to storage. For convenience in future reference herein, the combine harvesters may often hereinafter be referred to more simply as combines or harvesters, the tractors with grain transports may often hereinafter be referred to more simply as transports or crop or grain transports or grain carts, and the semi-trailer transporters may often hereinafter be referred to more simply as transporters.

As depicted in FIG. 1, combine harvester CH1 is at location CH1-GPS, combine harvester CH2 is at location CH2-GPS, and combine harvester CH3 is at location CH3-GPS. Similarly, grain transports GT1 and GT2 are at locations GT1-GPS and GT2-GPS, respectively, and transporters ST1 and ST2 are at locations ST1-GPS and ST2-GPS, respectively.

Additional agricultural equipment AE1, AE2, and AE3 is also shown, which agricultural equipment is not engaged in the harvesting of the particular crop in field 12. Such agricultural machines AE1, AE2, and AE3 are at locations AE1-GPS, AE2-GPS, and AE3-GPS, respectively.

Figure 2:
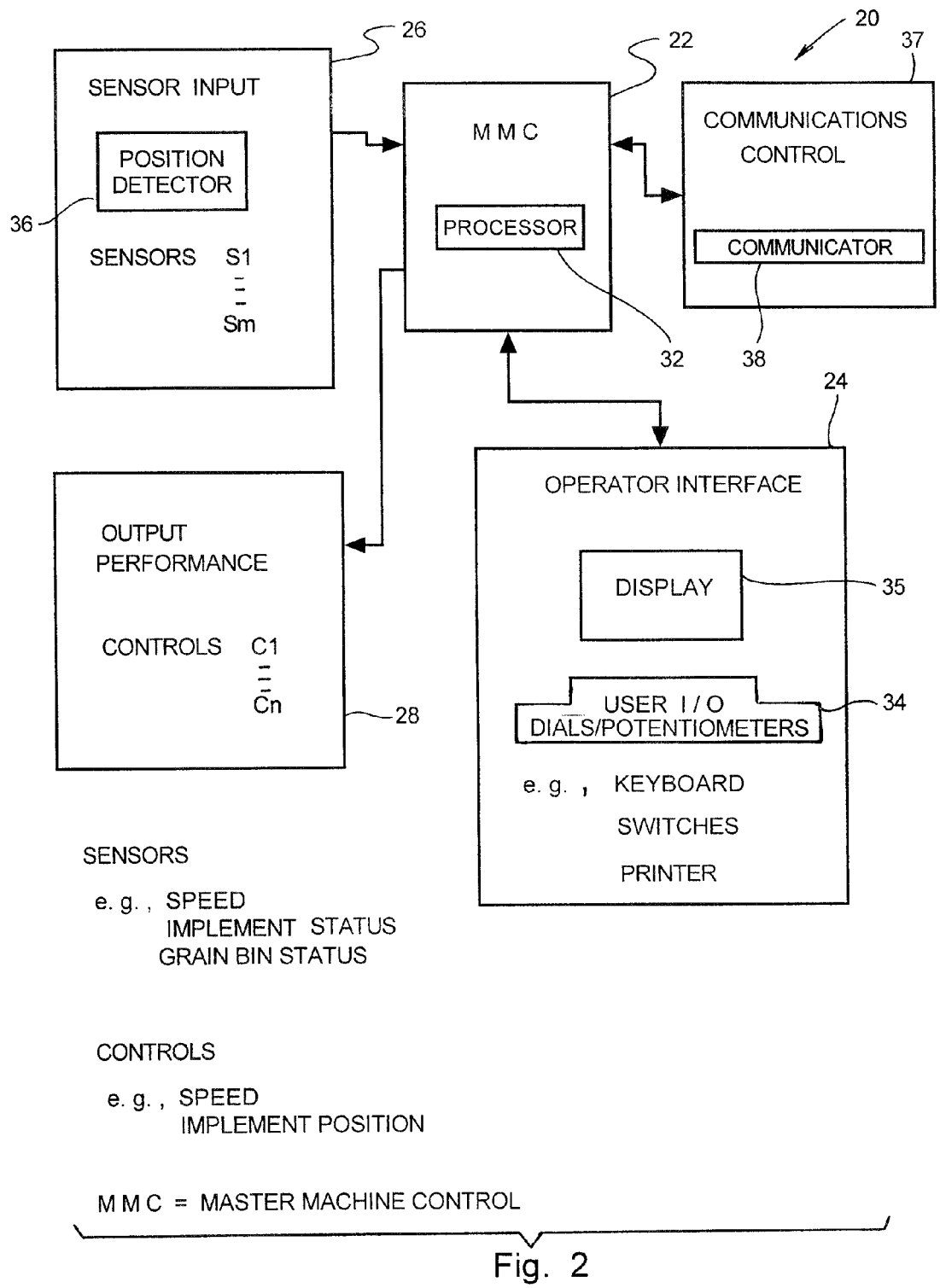

Each of such agricultural machines CH1 through CH3 and GT1 and GT2 includes an operating system 20 such as depicted in FIG. 2, which operating system includes a master machine control (MMC) 22, an operator interface portion 24, a sensor input portion 26, and an output performance portion 28. The MMC 22 typically includes a processor portion 32, often a microprocessor operating under program control, variously sometimes referred to as operating system software or master machine control software or the operating software or program, that is operatively connected to the other noted portions of the operating system 20.

Operator interface portion 24 typically includes a user input/output (I/O) interface 34 that may include, by way of example and not of limitation, a keyboard for the entry of commands or other input, control switches or devices, including adjustable potentiometers, and printout devices, as well as a display portion 35 that may include, by way of example and not of limitation, a video display, lights, and gauges. A touch screen display, which includes features for both input and output of information, may also be advantageously employed as part of the operator interface portion 24.

Sensor input portion 26 typically includes a plurality of sensors S1 through Sm connected to monitor various conditions of the agricultural machine and of the environment in which the agricultural machine is operating. Such sensor input portion 26 also includes or has associated therewith a position sensing or determination system 36, including known systems for determining the location of the agricultural machine by global positioning, which system 36 may hereinafter sometimes be referred to as a position detector system.

The output performance portion 28 includes various operation controls C1 through Cn for controlling various operations or actions of the agricultural equipment. For a harvester, such controls C1 through Cn may, for example, include equipment and controls for setting or adjusting the harvester's speed, steerage, height of cutting or harvesting implements, distribution of crop residue, and positioning in the field, among numerous other possible actions, such as positioning of the harvester unloading device, including, by way of example, the degree of angular projection or extension of the unload or discharge tube or arm of a combine harvester relative to such combine harvester, the orientation, including pitch, yaw, and roll status, of the discharge spout at the end of the discharge arm, and operation of grain transfer apparatus to effect the discharge of grain from a holding bin through the discharge arm. For other agricultural equipment, such as grain transports and transporters, such controls may include various other controls. Typically, most, if not all, of such agricultural equipment will include at least speed and steerage controls, and many may also have controls for determining or updating the GPS position of the equipment and effecting communications with other equipment, as will be further addressed hereinafter. Except to the extent otherwise addressed hereinafter, and for the most part, such controls, equipment, and apparatus, and the operation thereof, is well known and the particular features and configurations thereof are not critical to the present invention or its practice.

With such an operating system 20, MMC 22 is operable, based at least in part upon data and information received from the operator interface portion 24 and the sensor input portion 26, to control the operation of the agricultural machine through output performance portion 28. Control of output performance portion 28 and of the individual controls C1 through Cn thereof is effected by the establishment by processor portion 32 of various performance parameters and the use of such performance parameters in controlling the individual controls C1 through Cn.

When the performance parameters are established based primarily, if not exclusively, upon data made available through the operator interface portion 24 and the sensor input portion 26, the performance parameters are typically considered to be machine-specific performance parameters. Certain of the machine-specific parameters may change or be modified based upon inputs received from sensors S1 through Sm as the harvesting operation proceeds, while other performance parameters may remain set and unchanged.

Additionally, in accordance with the present invention, operating system 20 also includes a communications control portion 37, operatively connected to MMC 22, that serves as a gateway for the communication of data and information between MMC 22 and external sources. Such communications control portion 37 allows a user to control the wireless transmission of data and information to or the receipt of data and information from external sources, which data and information can be utilized by the equipment operator or the equipment itself to determine further actions. In some instances, MMC 22 may be responsive to receipt of data and information, especially if such data or information is provided in response to a request for such data or information submitted to the external source, to display or output the received data or information, such as by the user I/O interface portion 34. In other instances, when MMC 22 is properly configured or programmed, MMC 22 may operate in response to such received data or information to effect certain actions by output performance portion 28 or changes in certain performance parameters, as a consequence of which some of the performance parameters might no longer be considered machine-specific.

The communications control portion 37 is generally capable of transmitting and receiving communications signals, including RF signals, such as might be required for GPS position determinations or for communications over RF links, but is not limited to the transmission and receipt of only longer distance communications signals and may, depending upon particular systems and users, also be capable transmitting and receiving short distance communications signals, such as, but not necessarily limited to, microwave signals associated with frequencies that often, if not typically, are in the low gigahertz range, including, by way of example and not of limitation, frequencies in the L, S, C, and X bands.

As previously noted, one example of a system that employs short range communications for interactively coordinating the positioning of a transferor-type vehicle and a transferee-type vehicle for the transfer of grain therebetween may be found in co-pending U.S. application Ser. No. 12/284,310, filed Dec. 18, 2008, which is incorporated herein by reference thereto.

As will be appreciated by those skilled in the art, communications control portion 37 may include modules, such as communicator module 38, that may take many forms and employ firmware and software designed or adapted to operate in conformity with the particular agricultural equipment (AE) with which they are employed and with the operating system software utilized in such agricultural equipment. Depending upon the particular forms of such modules and the operating systems of the agricultural equipment of which they form a part, greater or lesser functional responsibilities may be distributed between such modules and their component sections and portions, to the point that, in some instances, most of the firmware and software associated with the wireless communications may be subsumed within operating system hardware and software for the agricultural equipment, principally identified as being included within MMC 22, particularly where the agricultural equipment is provided by a manufacturer with an operating system that integrates to a great degree the hardware and software for the operation of such system, similar to the manner in which many personal computer systems may be provided with modem support integrated onto a motherboard and with related drivers and software included with the operating system software.

To greater or lesser degrees, the various other elements depicted in FIG. 2, may also be subsumed into such operating system hardware and software, and in some instances, position detection, including determination of a GPS position, may involve elements or portions of all of position detector 36 of sensor input portion 26, communications control portion 37, and MMC 22, especially when position detection makes use of global positioning signals.

In any event, the communications control portion 37 of operating system 20 is considered to be operable under control of MMC 22 to control the wireless signals transmitted and received by the agricultural equipment of which it forms a part. With particular regard to the present invention, MMC 22 and communications control portion 37 of operating system 20 of a particular harvester, such as harvester CH1, are designed and configured and operate to be able to operatively identify various other vehicles with which communications links may be established and to operatively connect or link to such other vehicles. The MMCs 22 and communications control portions 37 of harvesters CH2 and CH3 and grain transports GT1 and GT2 are similarly operable to establish such connectivity with other vehicles.

When a plurality of agricultural machines are positioned in a field, such as at positions as shown in FIG. 1, the operators of such agricultural machines may initiate actions to enable their individual vehicles to engage in vehicle to vehicle communications, hereinafter often referred to as V2V communications, with other vehicles that are within range of the communications signals. If two such vehicles, such as CH1 and GT1 are so enabled, exchanges of data can then transpire therebetween, as is indicated by the communications link depicted extending between harvester CH1 and grain transport GT1 in FIG. 1, and a communications link pairing can be negotiated and established therebetween, typically in response to actions by the operator of harvester CH1 indicating a desire for an unloading operation.

With reference to FIG. 1, it should be appreciated and understood that a similar communications link could likewise be established between harvester CH1 and grain transport GT2. In such event, based upon the exchange of logistical data by harvester CH1 and grain transports GT1 and GT2, positionings of such vehicles relative to one another can be determined. With the vehicles positioned as depicted in FIG. 1, it can thus be determined, either by manual communications or automatedly, that grain transport GT1 is nearer to harvester CH1 than is grain transport GT2, and harvester CH1 and grain transport GT1 can coordinate with one another to establish an electronic link therebetween for the purpose of an unload operation in accordance with which a unified grain transfer control system 50, such as is depicted in FIG. 3, is established for coordinating the relative positionings for grain transfer and for controlling the actual transfer of grain from harvester CH1 to grain transport GT1.

Figure 3:
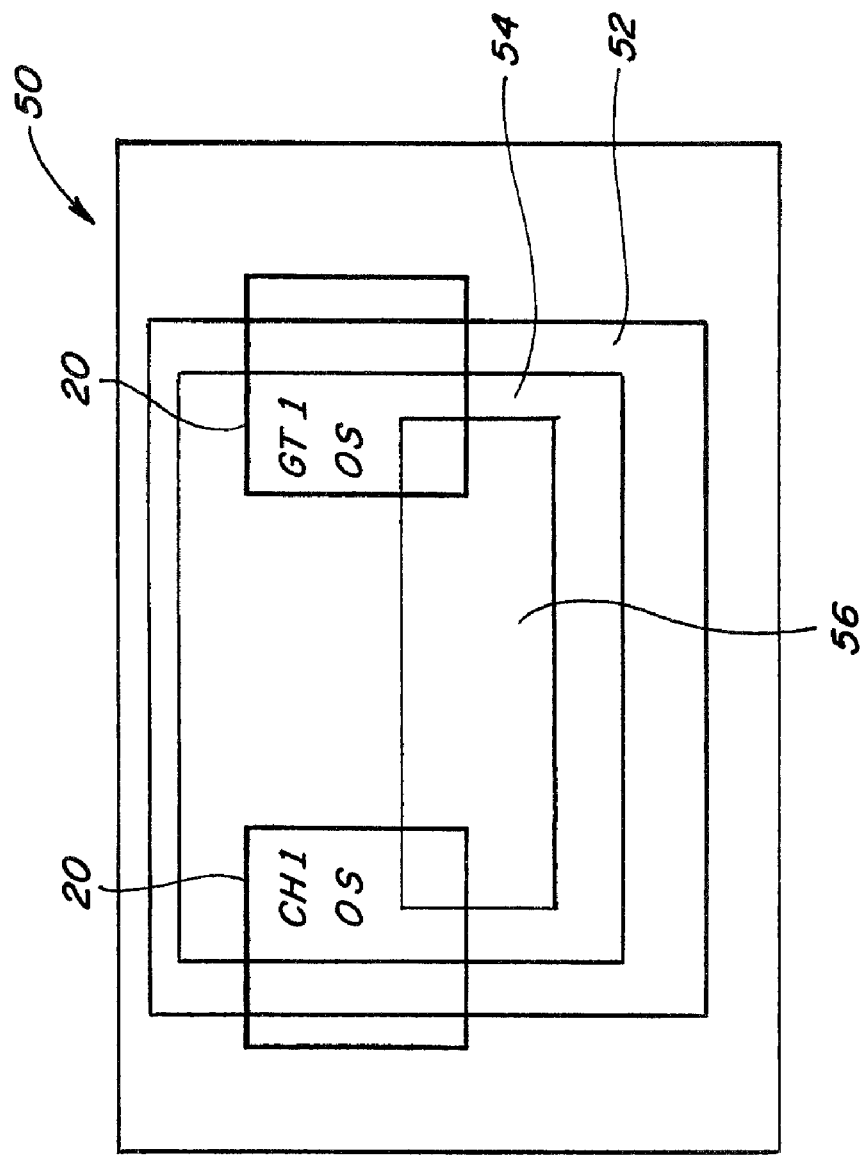
FIG. 3 is a block diagram of a typical grain transfer system according to the present invention, illustrating that, when a combine harvester and a grain transport are electronically linked for operation in unison, their operating systems, as depicted in FIG. 2, may be subsumed, at least in part, into such grain transfer control system.

When such an electronic link is established, the separate operating systems 20 of harvester CH1 and grain transport GT1 are, in effect, subsumed, in whole or in part, into a unified grain transfer control system 50, as illustrated in FIG. 3, that includes a positioning system 52 with a control portion 54. Such control portion 54 includes input controls, such as the controls available at the user I/O interfaces 34 of one or both of harvester CH1 and grain transport GT1. Typically, when the grain transfer control system 50 is established, such as when harvester CH1 and grain transport GT1 become electronically linked, one of the operating systems 20 will become the primary or master system and the other will become the secondary or slave system, although the established grain transfer control system 50 may be so operable that either vehicle operator may be able to enter at least certain data or information. In general, however, one of the processor portions 32 of the MMCs 22 will become the primary processor and the other will be a slave processor, until or unless some control change is thereafter effected.

Figure 4:
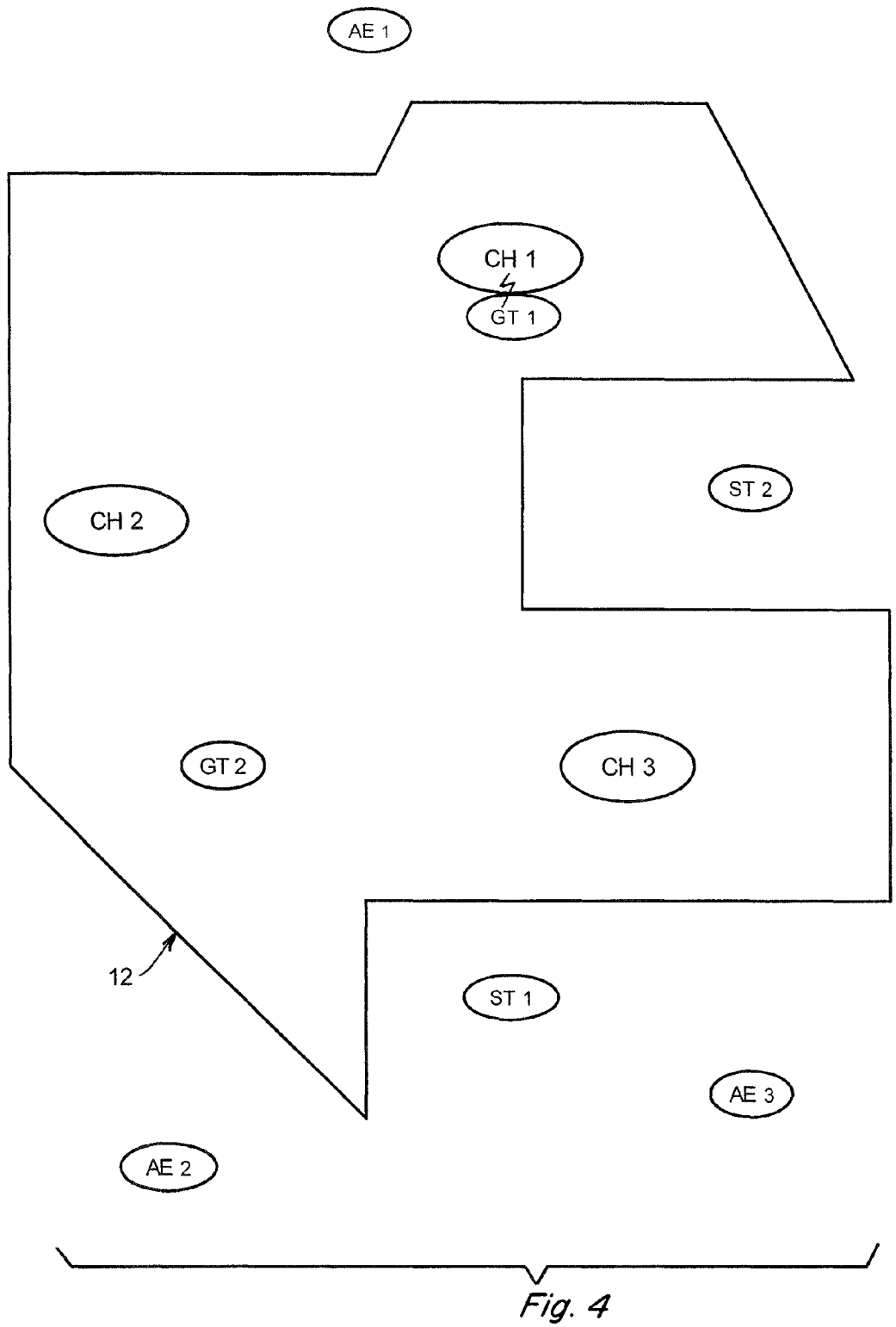
FIG. 4 is a diagram similar to FIG. 1, but showing various of the agricultural equipment as located at a subsequent time when grain transport GT1 has moved into close proximity to harvester CH1 for the purpose of effecting an unloading of grain from harvester CH1 to grain transport GT1.

FIG. 4 depicts a situation in which, under either manual or automated control, grain transport GT1 has been moved to adjacent combine harvester CH1 in a field and an electronic link established therebetween to permit an unloading operation to be effected. As better shown in FIG. 5, in preparation for the actual unload operation, discharge arm 60 of combine harvester CH1 is extended outwardly from combine harvester CH1, often, but not necessarily always, generally sidewardly from combine harvester CH1, such that discharge spout 62 at the outer end 64 of discharge arm 60 is positioned over the grain holding receptacle 70 of the adjacently spaced grain transport GT1, nearer the front end 72 than the back end 74 of such receptacle 70 and generally between sides 76 and 78 thereof.

Figure 5:
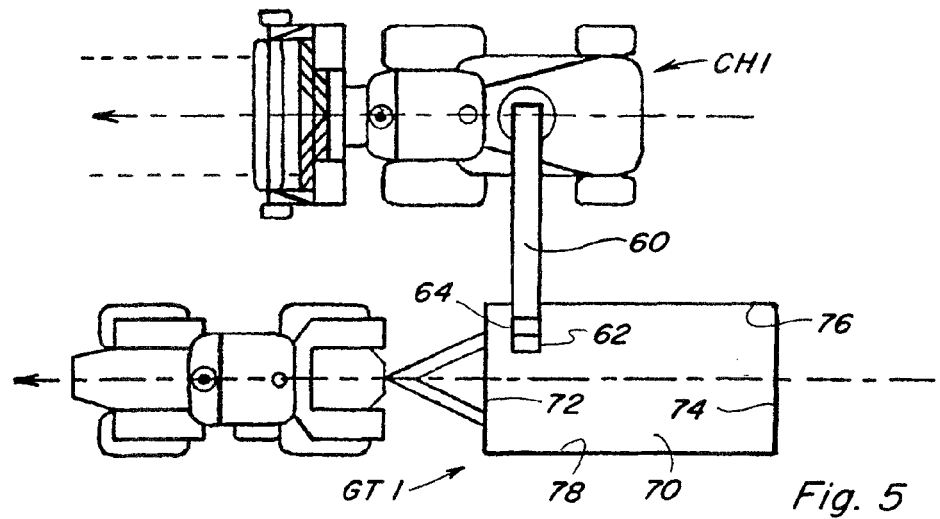
FIGS. 5-7 are generalized top plan views of the harvester CH1 and the grain transport GT1 of FIG. 4, depicting the harvester and grain transport in somewhat greater detail and in close proximity to one another as a grain transfer operation is effected and the extended discharge arm of the harvester is walked along a portion of the length of the grain holding receptacle of the grain transport.
Figure 6:
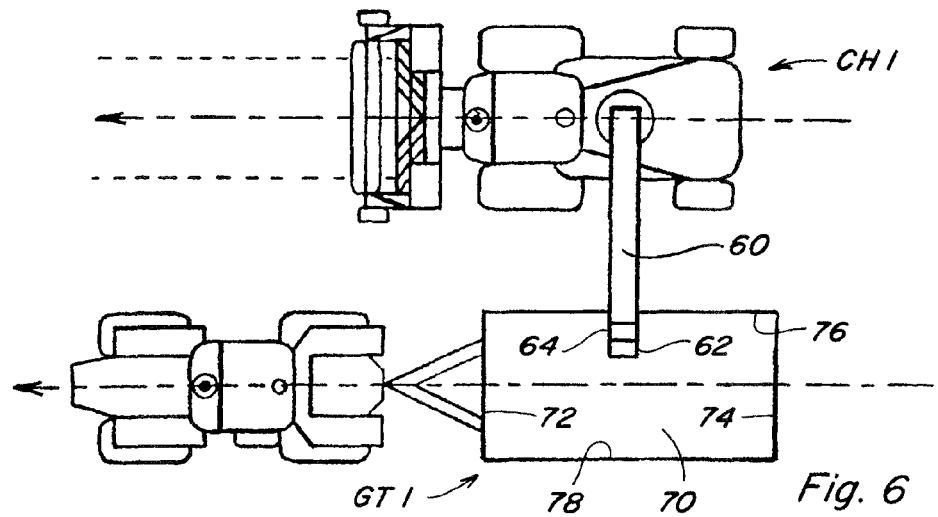
Figure 7:
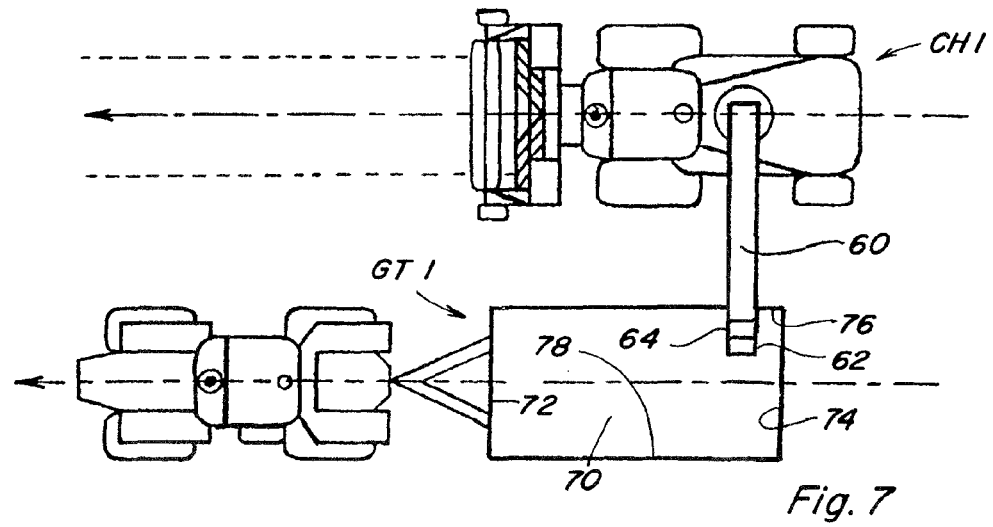

As will be further discussed hereinafter, when discharge spout 62 is at a transfer start position, such as in FIG. 5, an unload operation may be initiated and, as grain transfer thereafter proceeds, grain transfer control system 50 will monitor and control the further and ongoing positionings of combine harvester CH1 and grain transport GT1 during such unload operation, such as by increasing the speed of grain transport GT1 relative to combine harvester CH1, to effect, during a portion of the unload operation, movement of the discharge spout 62, while the discharge arm 60 remains in a generally fixed extension configuration relative to combine harvester CH1, above and along a portion of the length of the grain holding receptacle 70 of grain transport GT1, such as is depicted by FIGS. 5-7, until the discharge spout 62 reaches a transfer end position, such as in FIG. 7.

The transfer start and transfer end positions may be set or established by operator inputs or by stored system values or as determined based upon positioning information and specifications of the combine harvester CH1 and the grain transport GT1, and dwell times for the transfer of grain while the discharge spout is at such transfer start and transfer end positions may be set or established by operator inputs or by stored system values or as determined based upon status values associated with the grain transport GT1. Relative movement during an unload operation of the discharge spout 62 along a portion of the length of the grain holding receptacle 70 may be in accordance with operator inputs or stored or determined values. Dependent upon details of the particular system employed and desires of vehicle operators, such movement may, by way of example and not of limitation, proceed at a uniform rate of speed, in uniform or variable steps, at a sinusoidally varying rate of speed, or in accordance with a user defined profile of walk or creep velocity versus position along the length of the grain holding receptacle, but should result in the relative movement of the discharge spout 62 along a portion of the length of the grain holding receptacle 70 so as to transfer grain into the grain holding receptacle 70 along such portion of its length to effect a more uniform or even fill along the length of such grain holding receptacle 70.

Figure 8A:
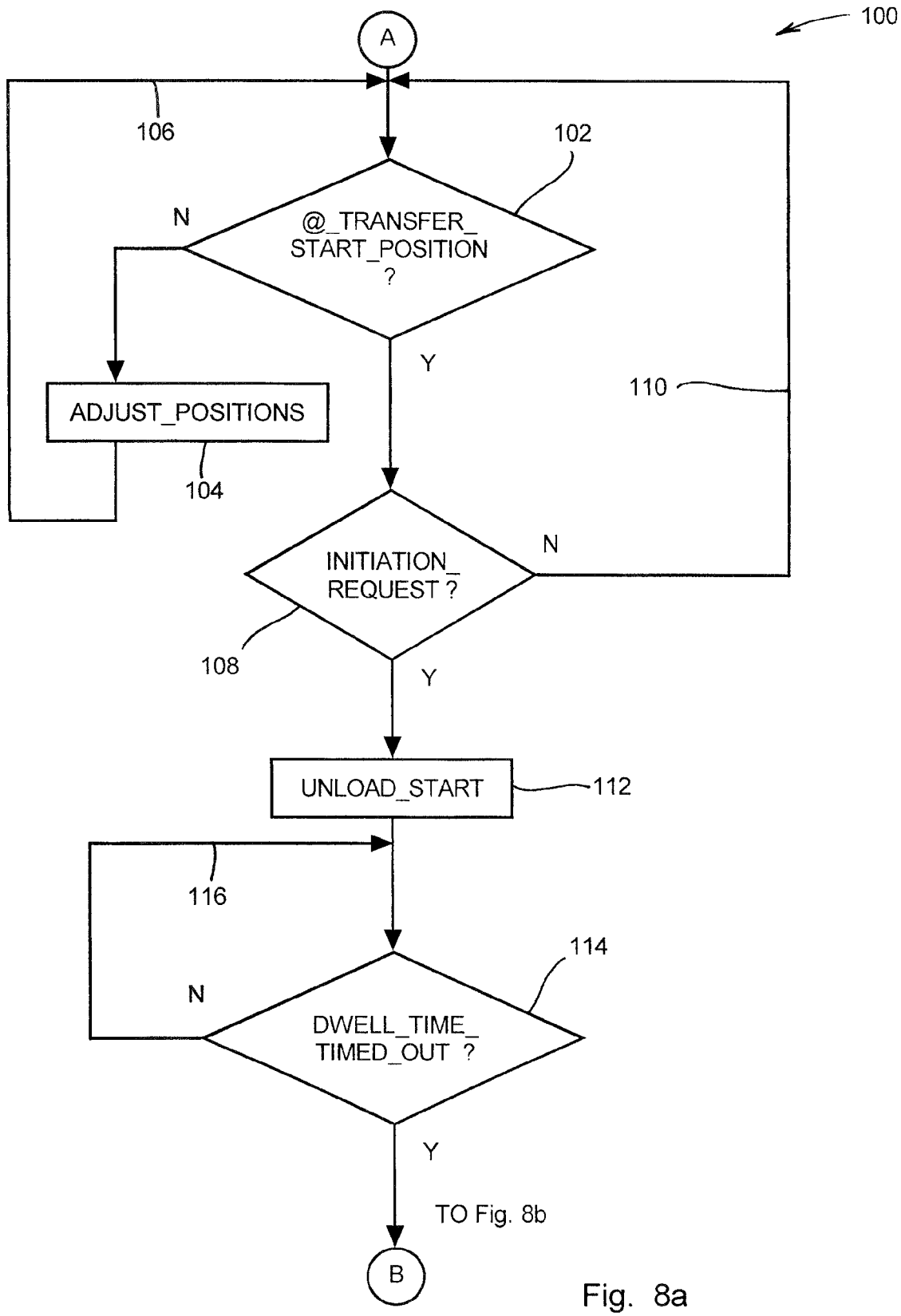
FIGS. 8a-8b depicts a flowchart for a routine that generally illustrates the operational flow of a grain transfer operation employing a grain transfer control system according to the present invention.
Figure 8B:
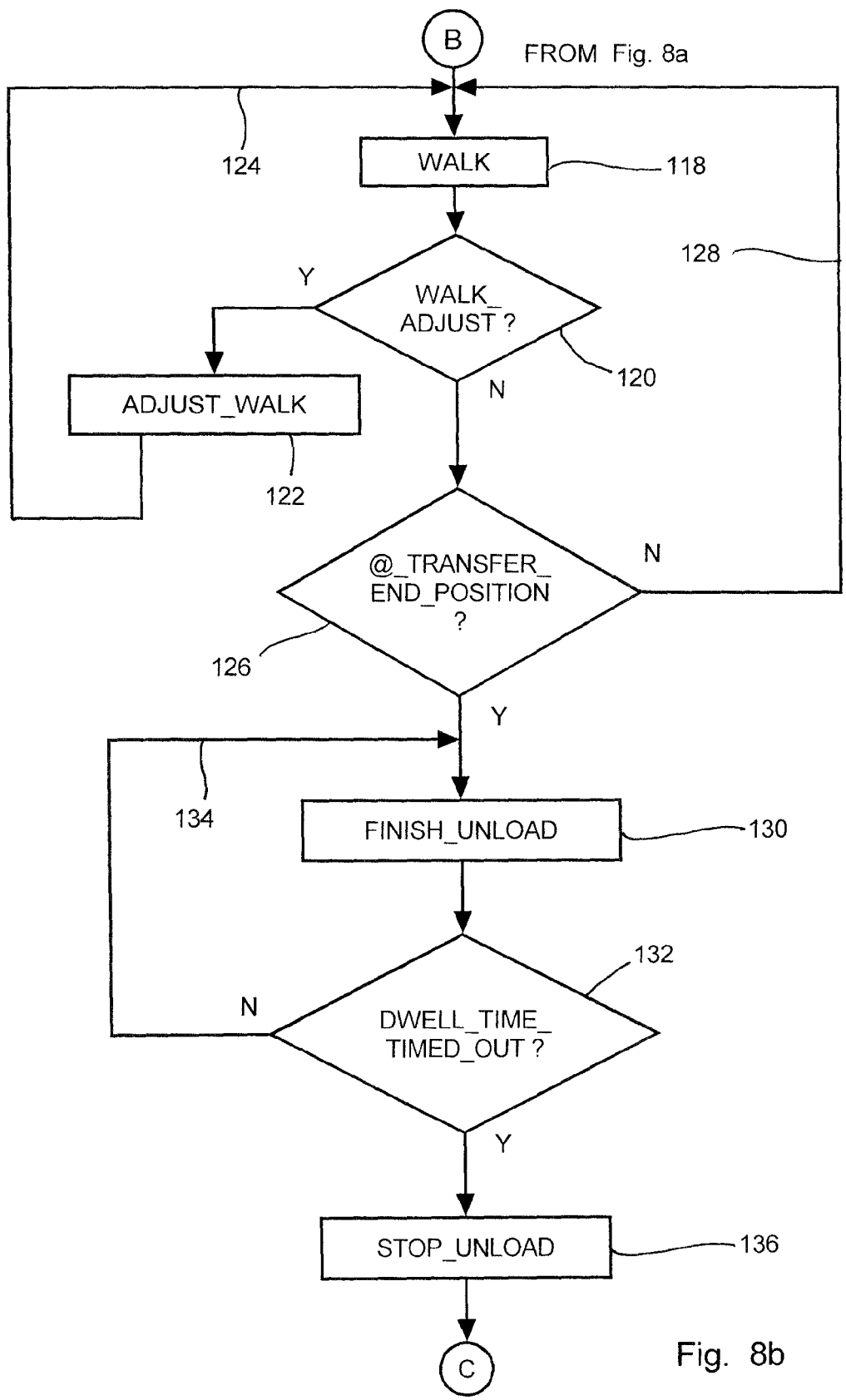

FIGS. 8a-8b depict a generalized flow chart 100 in accordance with which a grain transfer system 50 may operate to transfer grain from combine harvester CH1 to grain transport GT1 when such vehicles are electronically linked to operate in unison with one another and positioning control 52 is operating to position the discharge spout 62 at the transfer start position, which position may be determined from data and control information input by a user and/or stored by the grain transfer control system 50, including information regarding the type and specifications of grain transport GT1, including the dimensions of the grain holding receptacle 70, and the fill status thereof prior to the planned unload operation. In one preferred embodiment, the MMC 22 of the operating system 20 of combine harvester CH1 will act as the master control for the unified grain transfer control system 50 and processor portion 32 is a microprocessor programmed to effectively operate in accordance with flow chart 100.

In general, at entry point A of flowchart 100, the microprocessor 32 is controlling the positioning control 52 of the unified grain control system 50 to establish a relative positioning of combine harvester CH1 and grain transport GT1 preparatory to the initiation of a grain transfer operation. Microprocessor 32 proceeds to check, such as is represented by @_TRANSFER_START_POSITION? decision block 102, whether the discharge spout 62 is at the transfer start position yet. If not, adjustment of the relative positionings of combine harvester CH1 and grain transport GT1 proceeds, as noted by ADJUST_POSITIONS block 104 and loop 106 until the transfer start position is attained.

When the discharge spout 62 has been properly positioned at the transfer start position, the operation proceeds from decision block 102 to INITIATION_REQUEST? decision block 108, in accordance with which a check is made to determine whether a transfer initiation control input has been entered. Typically, in order to proceed, the operator of one of such vehicles, generally the operator of the combine harvester CH1, will need to effect a control entry at an operator interface portion 24. Dependent upon details of the system employed, positioning status information may be displayed or made available to an operator at the operator interface portion 24 and an operator can, upon noting that the discharge spout 62 is at the transfer start position, effect entry of a transfer initiation control input to commence the grain transfer.

If no transfer initiation control input has been made by the time of such check at decision block 108, operation will proceed back to decision block 102, as illustrated by loop 110. On the other hand, if a transfer initiation control input has been made, operation will proceed to UNLOAD_START block 112, in accordance with which transfer of grain from combine harvester CH1 through discharge arm 60 and discharge spout 62 into grain holding receptacle 72 of grain transport 70 will commence under control of microprocessor 32, and the operation will proceed to DWELL_TIME_TIMED-OUT? decision block 114.

If the dwell time for grain transfer while the discharge spout 62 is at the transfer start position has not timed-out, the operation will remain in a loop 116 until time-out occurs. When time-out of the dwell time is reached, operation will then proceed from decision block 114 (FIG. 8a) to WALK block 118 (FIG. 8b), in accordance with which microprocessor 32 will control through positioning control 52 the relative repositioning of discharge spout 62 along the length of the grain holding receptacle 70 of grain transport GT1 based upon the walk profile that has been established or determined, and operation will proceed to WALK_ADJUST? decision block 120.

At block 120, microprocessor 32 will check to see if any adjustments to the walk profile are necessary or desired, such as due to the entry by an operator at a user I/O interface 34 of an operator interface portion 24 of revised walk profile information. If so, operation will proceed to ADJUST_WALK block 122, in accordance with which adjustments will be made to the established walk profile before operation proceeds over loop 124 back to WALK block 118.

On the other hand, if, at block 120, it is found that no adjustments to the walk profile are necessary or desired, operation will proceed to @_TRANSFER_END_POSITION? decision block 126 where a check will be made to determine whether the discharge spout 62 has reached the transfer end position along the length of the grain holding receptacle 72. If not, the operation proceeds back over loop 128 to WALK block 118.

On the other hand, if the transfer end position has been reached, operation will proceed to FINISH_UNLOAD block 130, in accordance with which microprocessor 32 will effect a termination of the relative repositioning of the discharge spout 62 along the length of grain holding receptacle 70 while maintaining and continuing the transfer of grain through discharge arm 60 and its discharge spout 62 and into grain holding receptacle 70.

Operation will thereafter proceed to DWELL_TIME_TIMED-OUT? decision block 132, at which a check will be made to determine whether or not the dwell time for grain transfer while the discharge spout 62 remains at the transfer end position has timed-out. If not, the operation will remain in a loop 134 until time-out occurs.

When time-out of the dwell time is reached, operation will then proceed from decision block 132 to STOP_UNLOAD block 136, in accordance with which microprocessor 32 will then effect a termination of the grain transfer operation before proceeding to exit point C from such flowchart routine.

Figure 9:
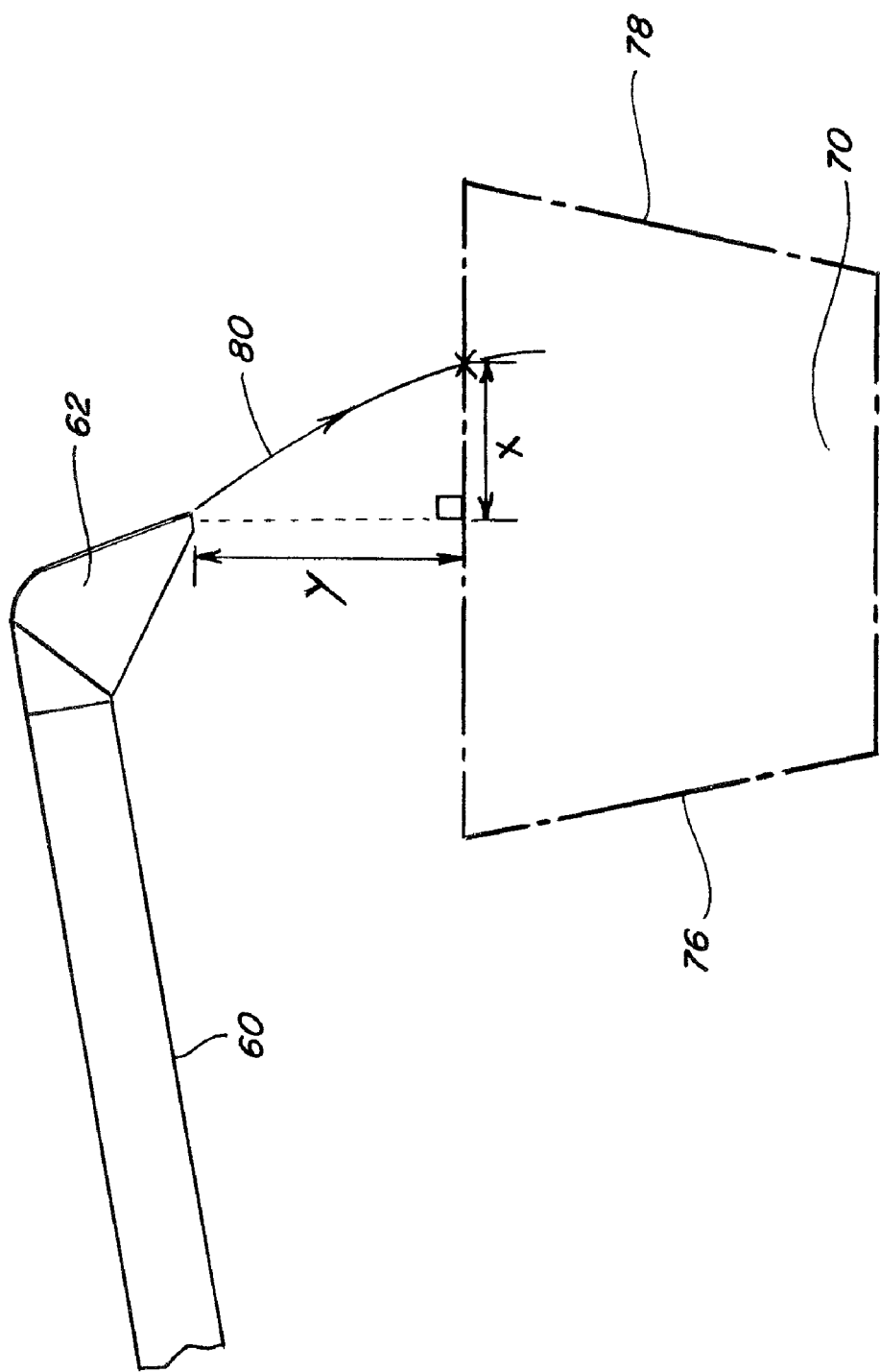
FIG. 9 is a front plan view of a grain holding receptacle of a grain cart in association with the discharge spout of a combine harvester illustrating how the height of the discharge spout above the grain holding receptacle and the inclination of the discharge spout can affect, in two dimensions, the grain flow path from the discharge spout.

It will be appreciated by those skilled in the art that the positioning of the discharge spout 62 above the grain holding receptacle 70 of the grain transport GT1 does not ensure that grain discharged through the discharge arm 60 and its discharge spout 62 will necessarily be directed into or fall within the grain holding receptacle, and that the position of the discharge spout above the top of the grain holding receptacle as well as the orientation of such discharge spout will influence the grain flow path from the discharge spout 62. In such regard, FIG. 9 illustrates how the height of the discharge spout 62 above grain holding receptacle 70 and the inclination of the discharge spout can affect, in two dimensions, considered the x and y dimensions, the grain flow path. Dependent upon the inclination of the discharge spout 62 at a height y above the grain holding receptacle 70, the grain being discharged from discharge spout 62 will typically follow a grain flow path 80 and be displaced from vertical a distance x across the width of the grain holding receptacle by the time it reaches the top of grain holding receptacle 70.

Similarly, if the discharge spout 62 were to be rotated forwardly or backwardly into or out of the view in FIG. 9, that is, in a z direction, the grain flow path could also be displaced from vertical a distance z generally along the length of the grain holding receptacle 70. Some, generally relatively minor, z direction displacement may also result from the speeds and relative speeds of the combine harvester CH1 and the grain transport as they move over the field, but such displacement will generally be relatively minor in view of the rapid flow rate of the grain through the discharge arm 60 and discharge spout 62 and the relatively small distance y between the discharge spout 62 and the top of the grain holding receptacle 70.

In some situations, the displacement from vertical of the grain being discharged from the discharge spout 62 can vary during the grain transfer process. For example, when operating on a side hill the weight of the grain in the grain tank located high on the combine CH1, can significantly affect the center of gravity of the combine harvester CH1. As grain is unloaded to the grain transport GT1, the combine harvester CH1 will tend to roll towards the "uphill" side of the combine CH1, while the grain transport GT1 will roll towards its "downhill" side. If the grain transport vehicle is on the uphill side of combine CH1, the y distance between the discharge spout 62 and the top of the grain holding receptacle 70 will decrease. However, if the grain transport GT1 is on the downhill side of combine CH1, the y distance between the discharge spout 62 and the top of the grain holding receptacle 70 will increase.

Inasmuch as displacement from vertical of the grain being discharged from the discharge spout 62 occurs, it is preferred that, during unload operations, actions be taken to try to ensure that the grain being discharged will fall within the grain holding receptacle of the grain transport 70. Dependent upon the details of the particular systems employed, displacement values can be determined or calculated in various ways, including from GPS data associated with the combine harvester CH1 and the grain transport GT1 and from sensor information including, but not limited to, position and/or height sensors, inertial measurement gyros or attitude angle sensors and the like, and stored specification data for such vehicles and their component parts, including the discharge arm 60 and discharge spout 62, and/or can be stored in look-up tables accessible by the grain transfer control system 50.

In addition, the type and condition of the harvested grain influences the grain flow path out of the discharge spout 62. Variations in grain density, moisture, particle size, and the like, can be determined in various ways including, but not limited to, sensor information, and stored look-up tables, accessible by the grain transfer control system 50 can include information related to the type and condition of the grain and its influence on grain flow path.

Based upon the above noted data and information, the grain transfer control system 50 can determine projected grain flow paths as the grain transfer operation proceeds and, if the projected grain flow path 80 at any time would fall outside of the grain holding receptacle 70, effect an early or emergency termination of the grain transfer operation so as to avoid spillage and waste.

Figure 10:
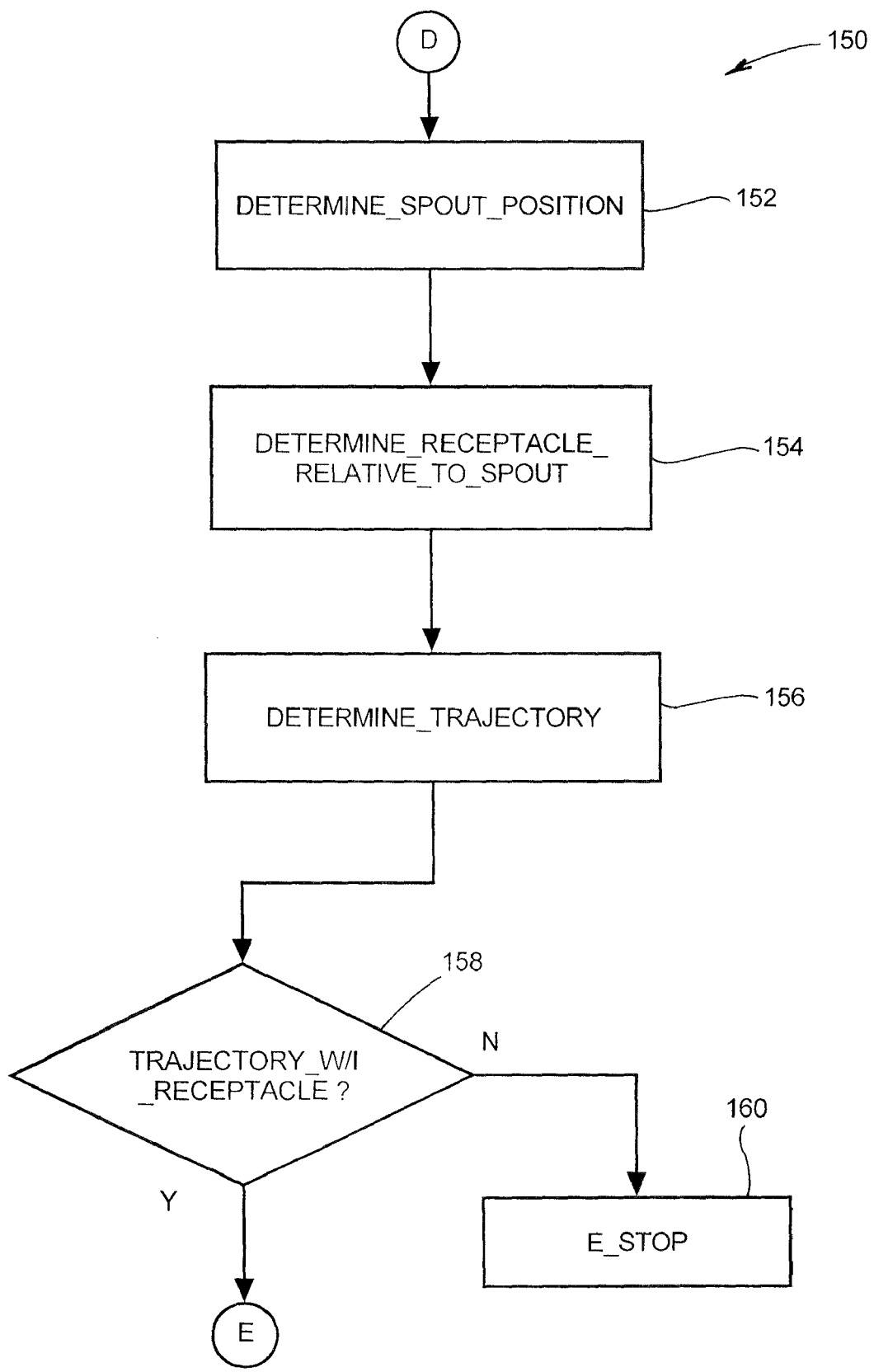
FIG. 10 is a generalized flowchart depicting a subroutine that may be employed in or with the operation illustrated by the flowchart of FIGS. 8a-8b.

Accordingly, FIG. 10 depicts a generalized flowchart 150 of a subroutine that may be employed in or with the operation illustrated by flowchart 100 of FIG. 8. Such subroutine may be called and readily utilized in the performance of blocks 112, 114, 118, 126, 130, and 132 of flowchart 100.

When the subroutine of flowchart 150 is called, microprocessor 32 enters the subroutine at entry point D and proceeds to DETERMINE_SPOUT_POSITION block 152, in accordance with which microprocessor 32 operates to determine the spout position, preferably, but not necessarily, by reference to GPS data.

Operation thereafter proceeds from block 152 to DETERMINE_RECEPTACLE_RELATIVE_TO_SPOUT block 154, in accordance with which microprocessor then operates to determine the position of the grain holding receptacle 70, including the positions of the front, rear, and sides 72-78 thereof, preferably, but not necessarily, by reference to GPS data, and the positions thereof relative to the discharge spout 62.

Once such position information has been determined, operation will thereafter proceed to DETERMINE_TRAJECTORY block 156, in accordance with which microprocessor 32 will operate to determine, from the position information developed at blocks 152 and 154, the projected trajectory of the grain being discharged from discharge spout 62. As has been previously noted, depending upon the details of the particular grain transfer control system 50 being employed, such determination may involve or require various calculations or reference to stored data and information, including certain stored look-up tables.

Operation next proceeds from block 156 to TRAJECTORY_W/I_RECEPTACLE? decision block 158 for a check of whether or not the projected trajectory of the grain from discharge spout 62 would fall within the grain holding receptacle 70. If so, operation would proceed to exit the subroutine at point E and return to the point of call in the appropriate block 112, 118, or 130 of flowchart 100. If not, operation would proceed, instead, to E_STOP block 160, in accordance with which microprocessor 32 would operate to effect an early or emergency stop of the grain transfer operation in order to avoid spillage and waste of the grain.

Upon any termination of a grain transfer operation, whether a normal termination or an early or emergency termination, notifications of such termination will typically be provided to the operators of the vehicles involved in the grain transfer operation so that appropriate actions can be taken thereby. Depending upon the particular designs of various systems, the discharge arm 60 may then be repositioned by harvester CH1 and actions to return combine harvester CH1 and grain transport GT1 to independent control may be effected. Such actions might, but need not necessarily, include the automated steerage and movement of the grain transport to distance the grain transport GT1 from the combine harvester CH1 by some degree to avoid possible entanglement or collision between such vehicles as independent control of such vehicles is effected. In such regard, positive actions by the vehicle operators may, but need not necessarily, be solicited prior to the return of individual control to such operators or their vehicles.

Following the termination of a grain transfer operation and such other actions as may be deemed appropriate or desirable before disengagement of the pairing between harvester CH1 and grain transport GT1, the electronic linkage between harvester CH1 and grain transport GT1 will be terminated.

Those skilled in the art will recognize and understand that, in addition to those circumstances discussed hereinabove that would result in termination of a grain transfer operation, various other circumstances could arise as a result of which interruption or termination of grain transfer would be appropriate or prudent. In such regard, such circumstances might, for example, arise if the operator of harvester CH1 activated a control or entered a command requesting a temporary cessation of unloading, such as while he addresses some issue associated with his vehicle that will not result in a loss of unified speed and positioning control or out of limits or failure conditions for the requisite transfer conditions, or if a requisite transfer condition that is being monitored goes out of limits or otherwise fails, even if only momentarily or briefly.

Failures of certain equipment, adverse weather, and adverse topographical conditions are other circumstances that might arise and whose occurrence might make it prudent, if not necessary, to terminate the grain transfer operation. More seriously, inasmuch as the proper positioning of grain transport GT1 relative to harvester CH1 is of great significance in effecting an unloading operation, a failure or other disconnection of the unified speed and positioning control or a failure of the communications link between harvester CH1 and grain transport GT1 would be other circumstances that would be expected to result in termination of a grain transfer operation. Similarly, if V2V communications of a vehicle were to become disabled, such as by the operator of a vehicle operating a V2V control thereof to disable V2V communications by such vehicle, termination of the grain transfer operation would be appropriate.

The particular manners in which grain transfer control systems according to the present invention address or react to such circumstances will depend, to a large extent, upon the details of the particular systems and the particular circumstances encountered. Appropriate designs and operations to address such circumstances and to effect appropriate terminations of grain transfer operations may be readily developed by those skilled in the art.

Although the foregoing discussions have addressed the positionings of the vehicles and their components primarily by reference to GPS coordinates and systems, it should be understood and appreciated that various other techniques and equipment could be employed to determine the relative positionings of the vehicles, and that positioning systems other then GPS positioning systems discussed hereinabove, which systems have been found to generally operate to provide generally accurate and reliable positioning information, may be advantageously utilized with the present invention.

While the foregoing discussion has most specifically addressed the unloading of grain from a harvester to a grain transport, it should also be understood and appreciated that the present invention is not limited to such types of vehicles and to grain unloading, but may be advantageously employed with various transferor-type and transferee-type vehicles, including semi-trailer transporters, for coordinating the transfer therebetween of various, generally crop, materials.

In light of all the foregoing, it should thus be apparent to those skilled in the art that there has been shown and described a grain transfer control system, and method of use thereof, which permit, along the length of a grain holding receptacle of a transferor-type vehicle, a more even fill to be realized from a grain transfer operation. However, it should also be apparent that, within the principles and scope of the invention, many changes are possible and contemplated, including in the details, materials, and arrangements of parts and the sequences of operation which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A grain transfer control system for automatedly controlling the transfer of grain from a mobile transferor vehicle to a grain holding receptacle of a mobile transferee vehicle by varying relative positions and speeds thereof to effect a generally uniform fill of the grain holding receptacle, the transferor vehicle including a grain storage bin with a grain discharge assembly operable for effecting the transfer of grain out of the grain storage bin, such grain discharge assembly including a discharge arm having a discharge spout for directing a flow of grain therethrough and the discharge arm being extendible from such transferor vehicle to position the discharge spout relative to the grain holding receptacle, the grain holding receptacle having opposed ends and sides defining a predetermined length and width, respectively, of the grain holding receptacle, comprising:

a positioning system associated with the transferor vehicle and the transferee vehicle configured and operable for automatedly determining and controlling the relative positions and speeds therebetween as the transferor vehicle and the transferee vehicle are moved, said positioning system including a control portion associated with one of the transferor vehicle and the transferee vehicle configured and operable for automatically initiating and controlling a grain transfer operation in response to a request therefor when the transferee vehicle is positioned at a spaced distance from the transferor vehicle and the discharge spout is positioned to direct a flow of grain therefrom into the grain holding receptacle of the transferee vehicle nearer one of the ends of the grain holding receptacle and for thereafter effecting the grain transfer operation, said control portion including input controls operable by a user to input data prior to or during the grain transfer operation for setting performance parameters including at least some of: a transfer start position, a transfer end position, a duration of an initial dwell time, a duration of a terminal dwell time, a walk profile, position of the discharge arm, and the position and orientation of the discharge spout, that will be used to determine control information, and a processor configured and programmed to use predetermined performance parameters and the inputted data setting the performance parameters to determine control information to automatedly:

a) commence the grain transfer operation when the discharge spout is positioned at the transfer start position relative to the length of the grain holding receptacle of the transferee vehicle and to thereafter transfer grain for the duration of the initial dwell time while the discharge spout remains at said transfer start position, then b) effect an ongoing repositioning of the transferee vehicle relative to the transferor vehicle to walk the discharge spout along at least a portion of the length of the grain holding receptacle as grain transfer continues according to a predetermined walk profile selected from a group of walk profiles consisting of at least one of: a uniform rate of speed, uniform steps, variable steps, a sinusoidally varying rate of speed, or a user defined profile of velocity versus position along the length of the grain holding receptacle until the discharge spout reaches the transfer end position relative to the length of the grain holding receptacle of the transferee vehicle, and then c) continue grain transfer for the duration of the terminal dwell time while the discharge spout remains at said transfer end position, and d) terminate the grain transfer operation, whereby, the generally uniform fill of the grain holding receptacle is achieved.

2. The system of claim 1 wherein the performance parameters may be modified by input data from one or more sensors or external devices.

3. The system of claim 1 wherein said control portion includes a potentiometer adjustable by a user for inputting a dwell time.

4. The system of claim 1 wherein the performance parameters further include information representative of a fill condition of the grain holding receptacle prior to the grain transfer operation.

5. The system of claim 1 wherein the walk profile includes rate of walk data for the discharge spout along the length of the grain holding receptacle and wherein said rate of walk data can be varied during the course of a grain transfer operation to change the rate of walk during such grain transfer operation.

6. The system of claim 5 wherein said control portion includes a potentiometer adjustable by a user for inputting variable rate of walk data.

7. The system of claim 1 wherein said positioning system employs GPS determinations for determining and controlling the relative positions and speeds of the transferor vehicle and the transferee vehicle.

8. The system of claim 7 wherein at least one GPS sensor is associated with the transferor vehicle and at least one other GPS sensor is associated with the transferee vehicle.

9. The system of claim 8 wherein the discharge spout has a GPS sensor associated therewith.

10. The system of claim 8 wherein the position of the discharge spout relative to the grain holding receptacle and the length thereof is determined based upon the GPS positions of the transferor vehicle and the transferee vehicle and the orientations thereof and particular attitude of the discharge spout relative to the transferor vehicle.

11. The system of claim 1 wherein a projected discharge flow from the discharge spout into the grain holding receptacle is determined based upon the positions of the transferor and the transferee vehicle and the orientations thereof and the particular attitude of the discharge spout relative to the transferor vehicle.

12. The system of claim 11 wherein said processor is operable to determine during a grain transfer operation whether the projected discharge flow of grain from the discharge spout is directed to within the grain holding receptacle.

13. The system of claim 12 wherein said control portion of said positioning system includes a sensor input portion at which certain machine status information is made available to said positioning system.

14. The system of claim 13 wherein said control portion includes look-up tables and said processor is operable to determine from said look-up tables, based upon machine status information available at said sensor input portion during the grain transfer operation, the projected discharge flow of grain relative to the grain holding receptacle.

15. The system of claim 12 wherein said processor is programmed to terminate the grain transfer operation if the projected discharge flow of grain ceases to be directed within the grain holding receptacle.

16. The system of claim 1 wherein said input controls include operator override controls operable by a user and to which said control portion is responsive for terminating the grain transfer operation.

17. A method for automatedly controlling the transfer of grain from a mobile transferor vehicle to a grain holding receptacle of a mobile transferee vehicle by varying relative positions and speeds thereof to effect a generally uniform fill of the grain holding receptacle, the mobile transferor vehicle including a grain storage bin with a grain discharge assembly operable for effecting the transfer of grain out of the grain storage bin, such grain discharge assembly including a discharge arm having a discharge spout for directing a flow of grain therethrough and the discharge arm being extendible from such transferor vehicle to position the discharge spout relative the grain holding receptacle, the grain holding receptacle having opposed ends and sides defining a predetermined length and width, respectively, of the grain holding receptacle, the method comprising:

establishing an electronic link between the transferor and transferee vehicles and a unified grain transfer control system therefor, said grain transfer control system including:

a positioning system associated with the transferor vehicle and the transferee vehicle configured and operable for automatedly determining and controlling the relative positions and speeds therebetween as the transferor vehicle and the transferee vehicle are moved, said positioning system including:

a control portion associated with one of the transferor vehicle and the transferee vehicle configured and operable for automatedly initiating and controlling a grain transfer operation in response to a request therefor when the transferee vehicle is positioned at a spaced distance from the transferor vehicle and the discharge spout is positioned to direct a flow of grain therefrom into the grain holding receptacle of the transferee vehicle nearer one of the ends of the grain holding receptacle and for thereafter effecting the grain transfer operation, said control portion including:

input controls operable by a user to input data prior to or during the grain transfer operation for setting performance parameters including at least some of: a transfer start position, a transfer end position, a duration of an initial dwell time, a duration of a terminal dwell time, a walk profile, position of the discharge arm, and the position and orientation of the discharge spout, that will be used to determine control information, and a processor configured and operable to use predetermined performance parameters and the inputted data setting the performance parameters to determine control information, said processor programmed to automatedly:

a) commence the grain transfer operation when the discharge spout has been positioned at the transfer start position relative to the length of the grain holding receptacle of the transferee vehicle and to thereafter transfer grain for the duration of the initial dwell time while the discharge spout remains at said transfer start position, then b) effect an ongoing repositioning of the transferee vehicle relative to the transferor vehicle to walk the discharge spout along at least a portion of the length of the grain holding receptacle as grain transfer continues according to a predetermined walk profile selected from a group of walk profiles consisting of at least one of: a uniform rate of speed, uniform steps, variable steps, a sinusoidally varying rate of speed, or a user defined profile of velocity versus position along the length of the grain holding receptacle until the discharge spout reaches the transfer end position relative to the length of the grain holding receptacle of the transferee vehicle, and then c) continue grain transfer for the duration of the terminal dwell time while the discharge spout remains at said transfer end position, and d) terminate the grain transfer operation, determining control information using predetermined performance parameters and the inputted data setting the performance parameters, effecting the positioning of the transferee vehicle at a distance spaced from the transferor vehicle with the discharge spout at said transfer start position, and effecting commencement of the grain transfer operation, whereby, under control of said processor portion, said grain transfer control system thereafter automatedly effects transfer of grain for the duration of the initial dwell time while the discharge spout remains at said transfer start position, ongoing repositioning of the transferee vehicle relative to the transferor vehicle to walk the discharge spout along at least a portion of the length of the grain holding receptacle as grain transfer continues according to a predetermined walk profile selected from a group of walk profiles consisting of at least one of: a uniform rate of speed, uniform steps, variable steps, a sinusoidally varying rate of speed, or a user defined profile of velocity versus position along the length of the grain holding receptacle until the discharge spout reaches the transfer end position relative to the length of the grain holding receptacle of the transferee vehicle, continuation of grain transfer for the duration of the terminal dwell time while the discharge spout remains at said transfer end position, and termination of the grain transfer operation, to achieve the generally uniform fill of the grain holding receptacle.

18. The method of claim 17 wherein the performance parameters may be modified by input data from one or more sensors or external devices.

19. The method of claim 18 wherein said repositioning of the transferee-type vehicle relative to the transferor-type vehicle to walk the discharge spout along at least a portion of the length of the grain holding receptacle is dependent upon the performance parameters.

20. The method of claim 17 wherein said processor is operable to determine during a grain transfer operation whether the projected discharge flow of grain from the discharge spout is directed to within the grain holding receptacle and to terminate the grain transfer operation if the projected discharge flow would fall outside the grain holding receptacle.

* * * * *